Dec. 23, 1958  C. A. WATERS  2,865,417
MEAT GRINDER
Filed March 5, 1956 4 Sheets-Sheet 1
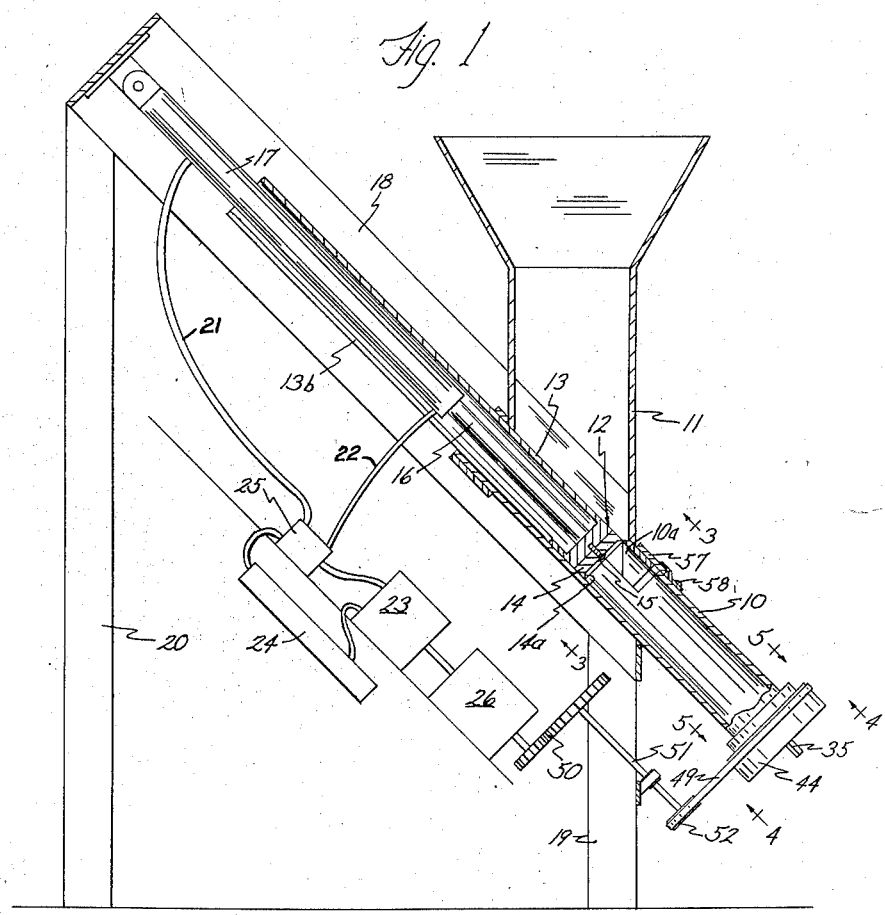
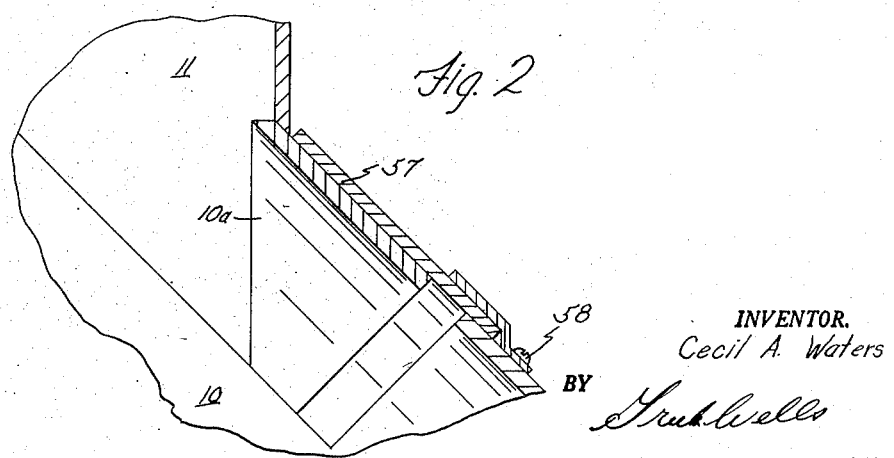
INVENTOR.
Cecil A. Waters
BY
*Truhlwells*
Atty.

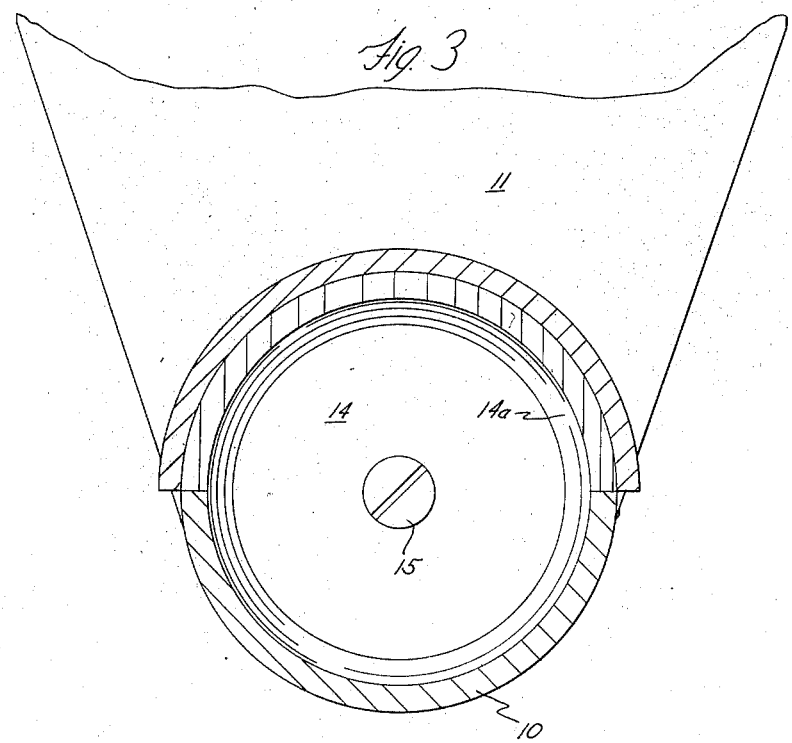
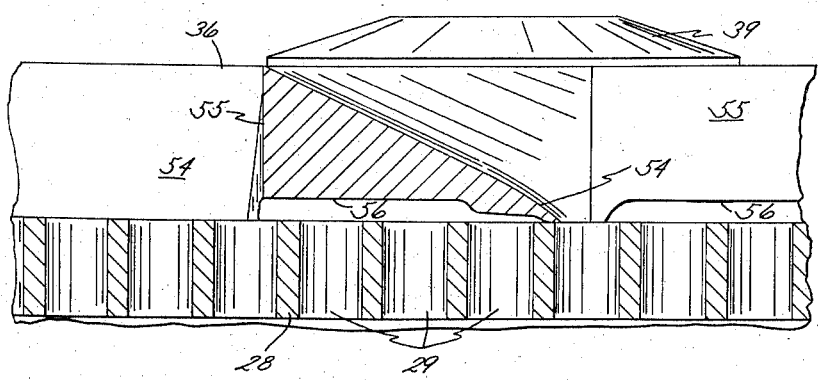

Dec. 23, 1958

C. A. WATERS 2,865,417

MEAT GRINDER

Filed March 5, 1956

INVENTOR.
Cecil A. Waters

BY

Atty.

INVENTOR.
Cecil A. Waters

United States Patent Office 2,865,417
Patented Dec. 23, 1958

2,865,417

MEAT GRINDER

Cecil Anthony Waters, Manhattan, Mont.

Application March 5, 1956, Serial No. 569,399

3 Claims. (Cl. 146—181)

This invention relates to the grinding of such products as meats. It is well known that heating and crushing the meat has an objectionable effect upon the ground product. It is particularly important in the grinding of such products as hamburger that good fresh meat is not caused to discolor and change flavor in the grinding. It is a purpose of this invention to provide a grinder wherein the working and crushing of the meat that now takes place in the grinders generally used is avoided.

The grinders that are now generally used for such products as hamburgers, utilize a cylinder with a feed screw rotating therein to force the meat through die openings of the proper size. Chopped up pieces of meat of the size small enough to go into the cylinder are dropped through a hopper or inlet to engage the screw and are then forced by rotation of the screw through the cylinder to a die at some distance from the inlet. Usually there is a rotating knife secured on the feed screw that cuts across the up stream face of the die. It is found that this knife has to be held rather tightly against the die and it looses its ability to cut very rapidly unless it is kept quite sharp.

The system of grinding just described is one where the meat is worked and squeezed by the screw as the screw forces the meat around and around in the cylinder and lengthwise into engagement with the die. The screw tends to wipe the meat across the die face in the same direction that the cutter or knife travels. Naturally this kind of operation must develop a great deal of pressure on the meat and must bruise and crush the meat. Most objectionable, however, is the heating up of the meat which does tend to discolor it, and the forcing of the juices of the meat out of a normal position in the meat fibers.

According to the present invention the meat is forced in any suitable manner just enough to move it along a cylinder straight toward a die at one end of the cylinder. This meat, forced in the direction of the die openings, is heated the least amount possible in order to force it to enter the die. In order to cut the meat so that it will move readily through the die, a cutter is provided on the up stream side of the die face but this cutter is held against the die face solely by the meat pressure on it and it is rotated without imparting any rotative motion to the meat other than the very small amount of force that is necessary to move the sloping face of the knife or cutter between the meat and the die face. By this method the meat moves endwise into the die openings, instead of being wiped across them, and is cut off rather than being crushed and then forced into the dies as in the ordinary grinder by a wiping action.

The nature and advantages of my invention will be more fully understood from the following description and the accompanying drawings wherein a preferred form of the invention is disclosed. The drawings and description, however, are illustrative only and are not intended to limit the invention except insofar as it is limited by the claims.

In the drawings:

Figure 1 is an elevational view with parts broken away and shown in section through a meat grinder embodying my invention showing somewhat diagrammatically the power mechanism for operating the grinder;

Figure 2 is an enlarged fragmentary sectional view showing a part of the structure shown in Figure 1 on an enlarged scale;

Figure 3 is an enlarged sectional view taken on the line 3—3 of Figure 1;

Figure 7 is an enlarged fragmentary sectional view taken on the line 7—7 of Figure 6;

Figure 4:
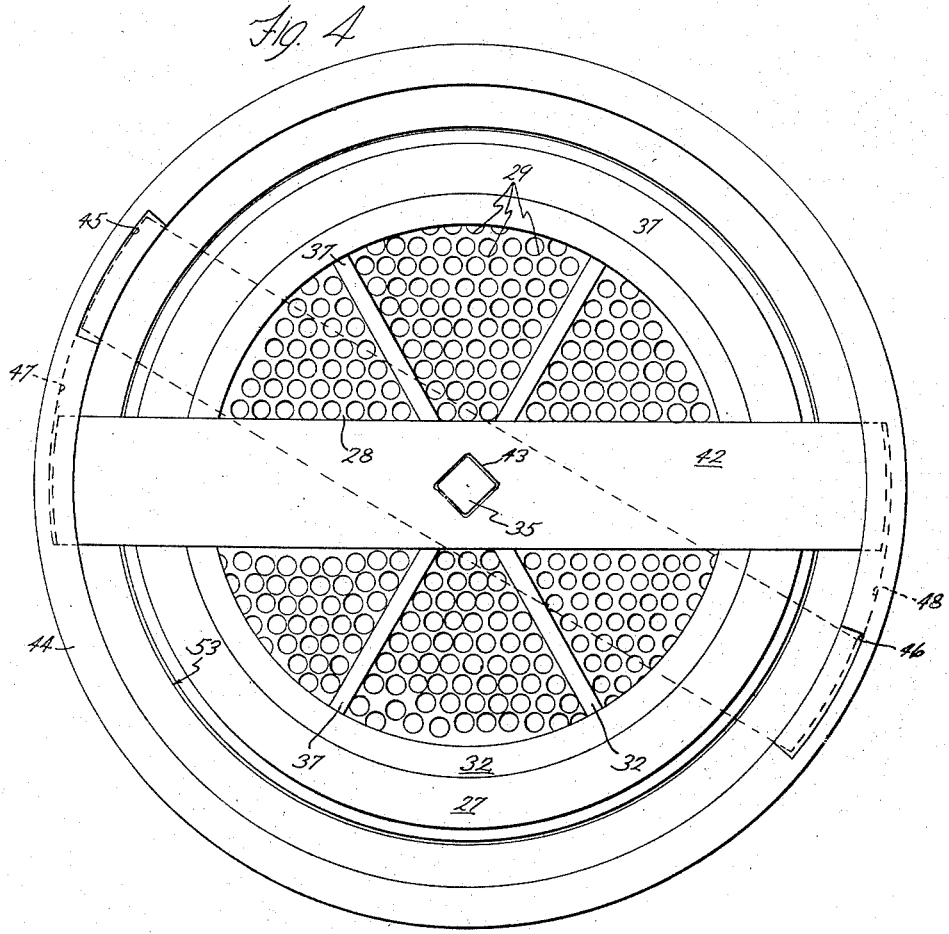
Figure 4 is an enlarged end view of the grinder, looking from the line 4—4 of Figure 1.

Referring now in detail to the drawings, my improved meat cutter uses a tube 10 to receive meat from a hopper 11. The meat to be ground is usually cut into pieces of varying sizes to get it into the hopper 11 so it will feed down into the tube 10. A suitable feeder 12 in the tube 10 is adapted to force the meat against a die in the lower end of the tube 10 without twisting or churning the meat. The feeder 12, as shown, comprises a tubular piston 13 slidable in the tube 10 and having a concaved head 14 removably secured to the end of the piston 13 by a screw 15. The head 14 has a sharpened peripheral edge 14a which cooperates with a removable segment 10a of the tube 10 to cut any meat particles caught partially in the tube 10 when the piston head 14 moves past the hopper 11 into the tube 10. The piston 13 is driven by a piston rod 16 which in turn is operated by a hydraulic cylinder 17. A frame 18 supports the tube 10, the hopper 11 and the cylinder 17 on uprights 19 and 20. The piston 13 has a slot 13b therein to pass the tubes 21 and 22 that supply fluid alternately to the ends of the cylinder 17 for moving the piston 13 in opposite directions. A pump 23, a reservoir 24 and a control valve 25 are shown diagrammatically to indicate the means for supplying fluid to the cylinder 17. The pump is shown as driven by a motor 26 which also drives the meat cutting knife as will be presently explained.

Any suitable equivalent of the parts 12 to 25 may be used to press meat in the tube 10 toward the die at the lower end without stirring or heaing it. The meat must not be worked or torn apart as it moves to the cutter and die parts because such action creates heat and forces the juices of the meat out of their natural places in the fibers of the meat.

Figure 8:
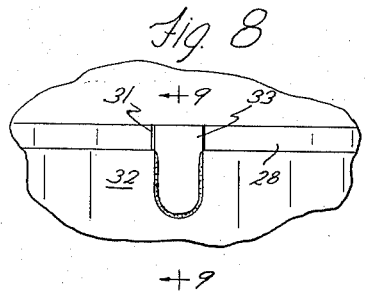
Figure 8 is a detail view taken at 8—8 of Figure 5.
Figure 9:
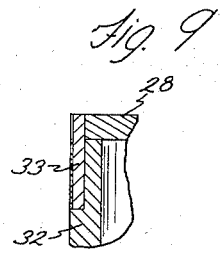
Figure 9 is a sectional view taken on the line 9—9 of Figure 8.
Figure 5:
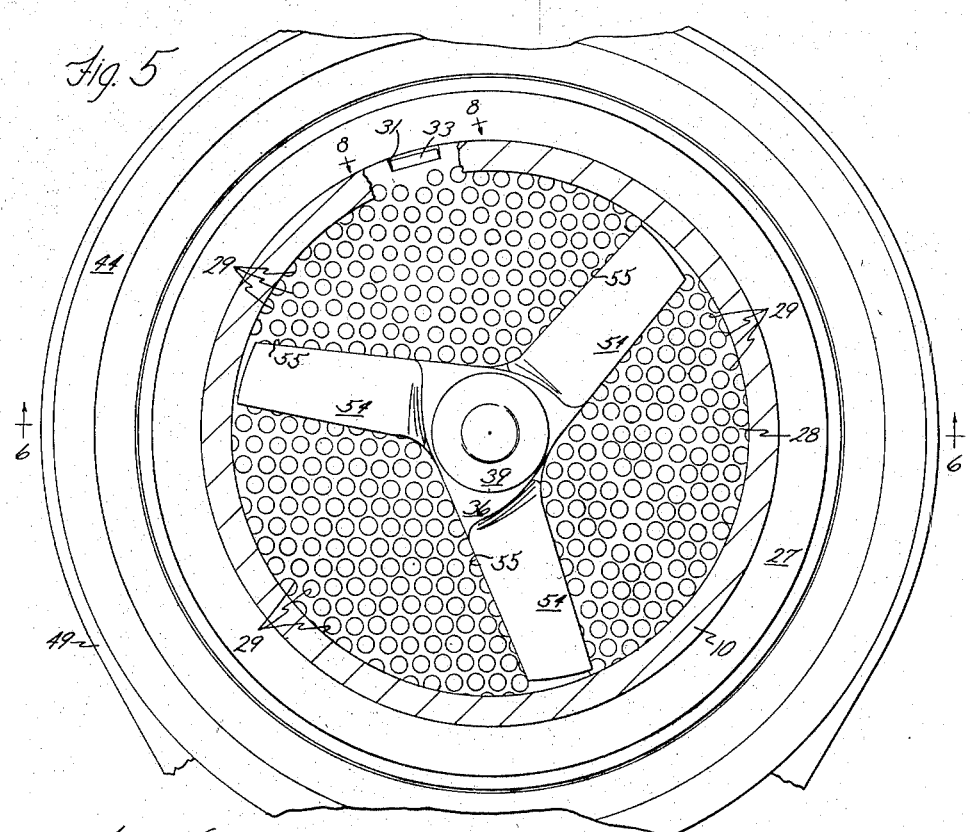
Figure 5 is an enlarged sectional view taken on the line 5—5 of Figure 1.
Figure 6:
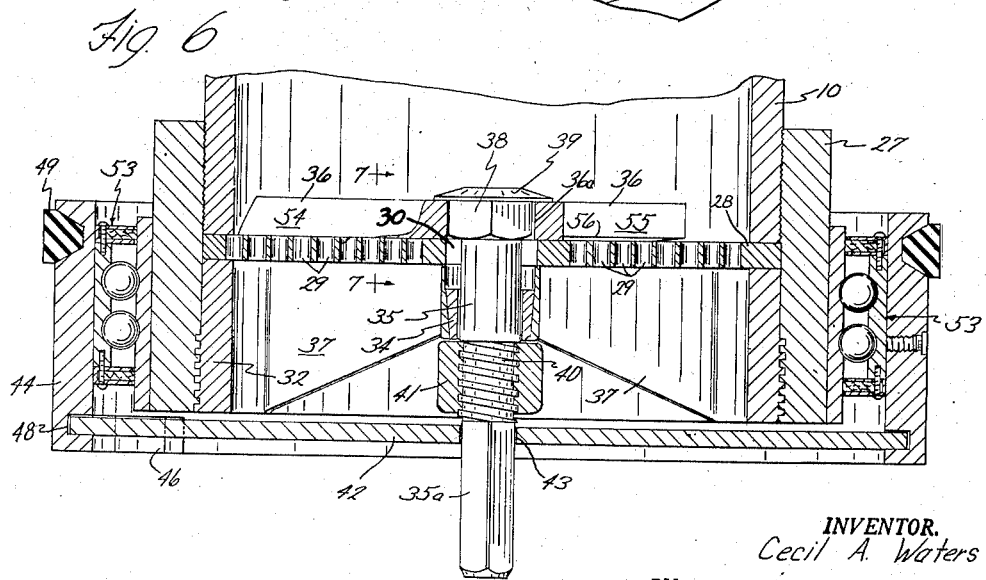
Figure 6 is a sectional view taken on the line 6—6 of Figure 5.

A die holding head 27 is secured to the lower end of the tube 10. The lower end of the tube 10 provides a shoulder to receive a die 28 which contains a multiplicity of apertures 29 through which the meat is forced. The die has a central aperture 30. It also has a notch 31 in its periphery (see Figures 5 and 8). The head 27 is internally threaded at its lower end to receive a die locking ring 32. The ring 32 carries a key 33 which engages the notch 31 in the die 28 to keep the die from turning.

The ring 32 also has web supports 37 for a bearing 34 that rotatably journals a drive stem 35 for a cutting knife 36 which rests against the meat receiving face of the die 28. The stem 35 has a squared portion 38 that non-rotatably receives the knife 36 and a head 39 that overlies the knife 36 and covers the center aperture 36a of the knife. A left hand threaded portion 40 of the stem 35 receives a nut 41. The nut 41 is merely to hold the parts assembled and does not rub the bearing 34. It tightens against the end of the bearing receiving part of the stem 35.

The free end portion 35a of the stem 35 is square in cross section to receive a drive member 42 which has a square aperture 43 therein. The drive member 42 is a bar that engages a drive ring 44. The ring 44 has notches 45 and 46 and undercut channels 47 and 48 for removably mounting the member 42. The drive ring 44 is a pulley receiving a drive belt 49 that is driven through reduction gearing 50, shaft 51 and pulley 52 from the motor 26. Bearings 53 journal the drive ring 44 upon the head 27.

Referring now to the knife 36, this knife rides on the die 28 and is held against the die by the pressure of meat against it. The knife is a three bladed one with front bevelled faces 54 and rear faces 55 which are perpendicular to the die 28. The meat that doesn't enter a die opening 29 before a blade 36 cuts it is lifted by the bevelled face 54 and drops down on the die when the rear face 55 passes beneath it. This dropping off appears to force the meat into the die openings very well so it is ready to be cut by the next blade. The blades are under cut as indicated at 56. With this construction the blades remain sharp for a long time.

The removable segment 10a is covered by a split sleeve 57 that is fitted around the cylinder 10 and can be moved down on the cylinder by releasing a screw 58 that holds the sleeve 57 in place. The segment 10a can be moved up into the hopper 11 and lifted out when it needs to be sharpened.

My improved meat grinder takes the meat, which is cut in large pieces and dropped into the hopper 11, and presses it down against the face of the die 28. This is accomplished with a minimum of working of the meat. The downward pressure of the piston subjects the meat to a continuous pressure without agitating it. The only other moving element contacting the meat is the knife 36 which is held against the die 28 by the pressure of the meat. The knife being driven by the stem 35 from the discharge side of the die 28, disturbs the uncut meat a minimum amount in slicing off the portions of the meat that have been forced into the die openings 29 by the pressure exerted on the meat column in the cylindrical tube 10.

It is believed that the nature and advantages of my invention will be apparent from the foregoing description.

Having thus described the invention, I claim:

1. In a meat grinder having a meat confining tube, a multiple apertured die closing one end of the tube and having a central aperture for a drive stem, and means in the tube to press meat endwise against said die, the improvement comprising a knife having a central non-circular aperture bearing on the meat receiving face of said die and pressed against said face solely by the meat pressure against the knife, a tubular die holder removably secured to said tube, a drive stem having a head adapted to rest against the upstream face of said knife and having a non-circular portion fitting in the knife aperture, the stem extending through the die and die holder, a drive ring encircling the tube and die holder, bearings on said tube mounting said ring for rotation upon the tube, and means affixed to said drive ring extending inwardly therefrom across the die holder and non-rotatably engaging the stem whereby rotation of said drive ring on the bearings rotates the knife.

2. In a meat grinder having a meat confining tube, a multiple apertured die closing one end of the tube, said die having a central drive stem receiving aperture, and means in the tube to press meat axially of said tube against said die, the improvement comprising a knife having a central hub and blades extending outwardly from said hub toward the inner wall of the tube, a drive stem non-rotatably connected to said hub and extending through the central aperture of said die out of the tube, a die holder at the end of the tube, said holder having a central bearing therein supporting said stem, a drive ring surrounding said end of the tube, bearings on the tube on which the ring is journalled, a bar extending diametrically across said ring and releasably secured thereto, said bar being non-rotatably engaged with said stem.

3. In a meat grinder having a meat confining tube, a multiple apertured die closing one end of the tube and having a central aperture for a drive stem, and means in the tube to press meat endwise against said die, the improvement comprising a knife having a central non-circular aperture bearing on the meat receiving face of said die and pressed against said face solely by the meat pressure against the knife, a drive stem having a portion seated in the aperture of said knife and extending through the die and out of the tube, a die holding sleeve carried by the tube and retaining the die in place, a bearing carried by said sleeve in which bearing said stem is journalled, the sleeve having web supports extending inward and supporting said bearing, the drive stem being supported in said bearing and extending through it out of the tube and the sleeve, a drive ring encircling and journalled on the tube and a cross bar carried by the drive ring and non-rotatably receiving said stem.

References Cited in the file of this patent

UNITED STATES PATENTS

| | | |
|---|---|---|
| 498,940 | Otte | June 6, 1893 |
| 1,611,244 | Schmidt | Dec. 21, 1926 |
| 2,495,948 | Taylor | Jan. 31, 1950 |
| 2,624,384 | Ward | Jan. 6, 1953 |

FOREIGN PATENTS

| | | |
|---|---|---|
| 325,605 | France | Jan. 24, 1903 |